US008630864B2

(12) United States Patent
Ragot et al.

(10) Patent No.: US 8,630,864 B2
(45) Date of Patent: Jan. 14, 2014

(54) METHOD FOR SWITCHING RATE AND BANDWIDTH SCALABLE AUDIO DECODING RATE

(75) Inventors: Stéphane Ragot, Perros Guirec (FR); David Virette, Pleumeur-Bodou (FR); Balazs Kovesi, Lannion (FR)

(73) Assignee: France Telecom, Paris (FR)

( * ) Notice: Subject to any disclaimer, the term of this patent is extended or adjusted under 35 U.S.C. 154(b) by 979 days.

(21) Appl. No.: 11/989,313

(22) PCT Filed: Jul. 10, 2006

(86) PCT No.: PCT/FR2006/050697

§ 371 (c)(1), (2), (4) Date: Mar. 13, 2009

(87) PCT Pub. No.: WO2007/010158

PCT Pub. Date: Jan. 25, 2007

(65) Prior Publication Data

US 2009/0306992 A1 Dec. 10, 2009

(30) Foreign Application Priority Data

Jul. 22, 2005 (FR) .................................... 05 52286

(51) Int. Cl.
*G10L 15/00* (2013.01)

(52) U.S. Cl.
USPC ........................................................ 704/501

(58) Field of Classification Search
USPC ................................................ 704/500–504
See application file for complete search history.

(56) References Cited

U.S. PATENT DOCUMENTS

| | | | | |
|---|---|---|---|---|
| 6,496,794 | B1 | 12/2002 | Kleider et al. | |
| 6,590,833 | B1 * | 7/2003 | Teller | 367/125 |
| 7,145,898 | B1 * | 12/2006 | Elliott | 370/352 |
| 8,170,882 | B2 * | 5/2012 | Davis | 704/500 |
| 8,483,854 | B2 * | 7/2013 | Nagaraja et al. | 700/94 |
| 2001/0044712 | A1 * | 11/2001 | Vainio et al. | 704/201 |
| 2003/0086515 | A1 * | 5/2003 | Trans et al. | 375/346 |
| 2004/0049379 | A1 * | 3/2004 | Thumpudi et al. | 704/205 |
| 2005/0228651 | A1 * | 10/2005 | Wang et al. | 704/207 |
| 2009/0190780 | A1 * | 7/2009 | Nagaraja et al. | 381/119 |
| 2009/0192803 | A1 * | 7/2009 | Nagaraja et al. | 704/278 |
| 2011/0022924 | A1 * | 1/2011 | Malenovsky et al. | 714/752 |
| 2011/0142247 | A1 * | 6/2011 | Fellers et al. | 381/71.1 |
| 2012/0029923 | A1 * | 2/2012 | Rajendran et al. | 704/500 |

FOREIGN PATENT DOCUMENTS

GB 2 357 682 6/2001

OTHER PUBLICATIONS

B. Kovesi et al., "A scalable speech and audio coding scheme with continuous bitrate flexibility", Acoustics, Speech, and Signal Processing 2004, Proceedings, IEEE International Conference, Montreal, Quebec, Canada, vol. 1, pp. 273-276, May 17-21, 2004.

* cited by examiner

*Primary Examiner* — Michael N Opsasnick
(74) *Attorney, Agent, or Firm* — Cozen O'Connor

(57) ABSTRACT

A method of bitrate switching on decoding an audio signal coded by a audio coding system, said decoding comprising a post-processing step depending on the bitrate. On switching from an initial bitrate to a final bitrate, said method includes a transition step of continuous change from a signal at the initial bitrate to a signal at the final bitrate, one or both of said signals being post-processed. Application to transmission of VoIP speech and/or audio signals in data packet networks.

15 Claims, 9 Drawing Sheets

Figure 8

| Current wideband frame | Preceding wideband frame | Decoder behaviour |
| --- | --- | --- |
| yes | yes | Counter = max(counter+1,MAX_COUNT_RCV) |
| yes | no | |
| no | yes | If counter < MAX_COUNT_RCV then counter = 0,<br>Else band extension without transmission of information |
| no | no | Counter = 0 |

| n | Att(n) | n | Att(n) | n | Att(n) | n | Att(n) |
|---|---|---|---|---|---|---|---|
| 0 | 0 | 25 | 0 | 50 | 0 | 75 | 0.01 |
| 1 | 0 | 26 | 0 | 51 | 0 | 76 | 0.01 |
| 2 | 0 | 27 | 0 | 52 | 0 | 77 | 0.01 |
| 3 | 0 | 28 | 0 | 53 | 0 | 78 | 0.01 |
| 4 | 0 | 29 | 0 | 54 | 0 | 79 | 0.01 |
| 5 | 0 | 30 | 0 | 55 | 0 | 80 | 0.1 |
| 6 | 0 | 31 | 0 | 56 | 0 | 81 | 0.1 |
| 7 | 0 | 32 | 0 | 57 | 0 | 82 | 0.1 |
| 8 | 0 | 33 | 0 | 58 | 0 | 83 | 0.1 |
| 9 | 0 | 34 | 0 | 59 | 0 | 84 | 0.1 |
| 10 | 0 | 35 | 0 | 60 | 0 | 85 | 0.31 |
| 11 | 0 | 36 | 0 | 61 | 0 | 86 | 0.31 |
| 12 | 0 | 37 | 0 | 62 | 0 | 87 | 0.31 |
| 13 | 0 | 38 | 0 | 63 | 0 | 88 | 0.31 |
| 14 | 0 | 39 | 0 | 64 | 0 | 89 | 0.31 |
| 15 | 0 | 40 | 0 | 65 | 0.0001 | 90 | 0.5 |
| 16 | 0 | 41 | 0 | 66 | 0.0001 | 91 | 0.5 |
| 17 | 0 | 42 | 0 | 67 | 0.0001 | 92 | 0.5 |
| 18 | 0 | 43 | 0 | 68 | 0.0001 | 93 | 0.5 |
| 19 | 0 | 44 | 0 | 69 | 0.0001 | 94 | 0.5 |
| 20 | 0 | 45 | 0 | 70 | 0.001 | 95 | 0.707 |
| 21 | 0 | 46 | 0 | 71 | 0.001 | 96 | 0.707 |
| 22 | 0 | 47 | 0 | 72 | 0.001 | 97 | 0.707 |
| 23 | 0 | 48 | 0 | 73 | 0.001 | 98 | 0.707 |
| 24 | 0 | 49 | 0 | 74 | 0.001 | 99 | 0.707 |
| | | | | | | 100 | 1.0 |

Figure 9

METHOD FOR SWITCHING RATE AND BANDWIDTH SCALABLE AUDIO DECODING RATE

RELATED APPLICATIONS

This is a U.S. national stage of application No. PCT/FR2006/050697, filed on Jul. 10, 2006.

This application claims the priority of French patent application no. 05/52286 filed Jul. 22, 2005, the content of which is hereby incorporated by reference.

FIELD OF THE INVENTION

The present invention relates to a method of switching the bitrate when decoding an audio signal coded by a multirate audio coding system, more particularly a bitrate-scalable and, where applicable, bandwidth-scalable audio coding system. It relates also to an application of said method to a bitrate-scalable and bandwidth-scalable audio decoding system and a bitrate-scalable and bandwidth-scalable audio decoder.

The invention finds a particularly advantageous application in the field of transmitting speech and/or audio signals over packet networks of voice over IP type to provide a quality that can be modified as a function of the capacity of the transmission channel.

The method of the invention achieves transitions without artifacts between the various bitrates of a bitrate-scalable and bandwidth-scalable audio coder/decoder (codec), more specifically for transitions between the telephone band and the wideband in the context of bitrate-scalable and bandwidth-scalable audio coding with a telephone band core with bitrate-dependent post-processing and one or more wideband enhancement layers.

BACKGROUND OF THE INVENTION

In the usual way, the terms “telephone band” and “narrowband” refer to the frequency band from 300 hertz (Hz) to 3400 Hz and the term “wideband” is reserved for the band from 50 Hz to 7000 Hz.

Today there are many techniques for converting an audio-frequency (speech and/or audio) signal into a digital signal and for processing signals digitized in this way.

The most widely used techniques are “waveform coding” methods such as PCM or ADPCM coding, “parametric coding by analysis by synthesis” methods such as CELP (code excited linear prediction) coding, and “Perceptual coding in sub-bands or by transforms” methods. Narrowband CELP coding generally employs post-processing to enhance quality. This post-processing typically comprises adaptive post-filtering and high-pass filtering. The standard techniques for coding audio-frequency signals are described, for example, in “Speech Coding and Synthesis”, W. B. Kleijn and K. K. Paliwal editors, Elsevier, 1995. Only the techniques used in bidirectional transmission of audio-frequency signals are relevant here.

In conventional speech coding, the coder generates a fixed bitrate bit stream. This fixed bitrate constraint simplifies implementation and use of the coder and the decoder. Examples of such systems are G.711 coding at 64 kilo bits per second (kbps) and G.729 coding at 8 kbps.

In certain applications, such as mobile telephony, voice over IP, or communication over ad hoc networks, it is preferable to generate a variable bitrate bit stream, the bitrate values being taken from a predefined set. There are various multirate coding techniques:

- multimode coding controlled by the source and/or the channel, as used in the AMR-NB, AMR-WB, SMV, or VMR-WB systems.
- hierarchical coding, also known as “scalable” coding, which generates a bit stream that is referred to as hierarchical because it comprises a core bitrate and one or more enhancement layers. The G.722 system at 48 kbps, 56 kbps, and 64 kbps is a simple example of bitrate-scalable coding. The MPEG-4 CELP codec is bitrate-scaleable and bandwidth-scaleable (see T. Numura et al., A bitrate and bandwidth scalable CELP coder, ICASSP 1998).
- multiple description coding (see A. Gersho, J. D. Gibson, V. Cuperman, H. Dong, A multiple description speech coder based on AMR-WB for mobile ad hoc networks, ICASSP 2004).

In multirate coding, it is necessary to be sure that switching from one coding bitrate to another does not generate errors or artifacts.

Bitrate switching is simple if coding at all bitrates is based on the representation by the same coding model of an audio signal in the same bandwidth. For example, in the AMR-NB system, the signal is defined in the telephone band (300 Hz-3400 Hz) and coding relies on the ACELP (algebraic code excited linear prediction) model, except for the generation of comfort noise, which is nevertheless handled by an LPC (linear predictive coding) type model compatible with the ACELP model. Note that AMR-NB coding uses in the conventional way post-processing in the form of adaptive post-filtering and high-pass filtering, the adaptive post-filtering coefficients depending on the decoding bitrate. Nevertheless, no precautions are taken to manage any problems linked to the use of post-processing parameters varying according to the bitrate. In contrast, wideband CELP coding of AMR-WB type uses no post-processing, essentially for reasons of complexity.

Bitrate switching is even more problematic in bitrate-scalable and bandwidth-scalable audio coding. Coding is then based on models and bandwidths that differ according to the bitrate.

The basic concept of hierarchical audio coding is illustrated, for example, in the paper by Y. Hiwasaki, T. Mori, H. Ohmuro, J. Ikedo, D. Tokumoto, and A. Kataoka, Scalable Speech Coding Technology for High-Quality Ubiquitous Communications, NTT Technical Review, March 2004. In that type of coding, the bit stream comprises a base layer and one or more enhancement layers. The base layer is generated by a fixed low-bitrate codec called the “core codec”, guaranteeing the minimum coding quality. That layer must be received by the decoder to maintain an acceptable quality level. The enhancement layers are used to enhance quality. Although they are all sent by the coder, they may not all be received by the decoder. The main benefit of hierarchical coding is that it allows adaptation of the bitrate simply by truncating the bit stream. The number of layers, i.e. the number of possible truncations of the bit stream, defines the granularity of the coding. Coding is referred to as being of strong granularity if the bit stream comprises few layers, of the order of two to four layers, fine granularity coding allowing an increment of the order of 1 kbps.

Of greater interest here are hierarchical coding techniques that are bitrate-scalable and bandwidth-scalable with a telephone band CELP type core coder and one or more wideband enhancement layers. Examples of such systems are given in H. Taddéi et al., A Scalable Three Bitrate (8, 14.2 and 24 kbps) Audio Coder; $107^{th}$ Convention AES, 1999 with a strong granularity of 8, 14.2 and 24 kbps, and in B. Kovesi, D.

Massaloux, A. Sollaud, A scalable speech and audio coding scheme with continuous bitrate flexibility, ICASSP 2004 with fine granularity of 6.4 at 32 kbps, or MPEG-4 CELP coding.

Of the most pertinent references linked to the problem of bitrate switching in the context of bitrate-scalable and bandwidth-scalable audio coding, mention can be made of the international applications WO 01/48931 and WO 02/060075.

However, the techniques described in the above two documents deal only with problems of interworking between communications networks using telephone band and wideband coding.

In particular, international application WO 02/060075 describes an optimized decimation system for conversion from the wideband to the telephone band.

The method proposed in international application WO 01/48931 is a band extension technique that generates a pseudo-wideband signal from the telephone band signal, in particular by extracting a "spectral profile". The known similar techniques of the prior art mainly address problems linked to wideband to telephone band switching by seeking to avoid band reduction by using a band extension technique with no transmission of information for generating a wideband signal from the received telephone band signal. Note that those methods do not really seek to control the transition between bandwidths and that they also have the drawback of relying on band extension techniques of quality that is highly variable, and that they therefore cannot guarantee stable output quality.

SUMMARY OF THE INVENTION

One object of the present invention is to provide a method of switching bitrate on decoding an audio signal coded by a multirate audio coding system, said decoding including at least one post-processing step depending on the bitrate, which method allows transitions to be processed between different bitrates for which the post-processing used depends on the decoding bitrate, so as to eliminate particularly sensitive artefacts in the event of rapid variations of bitrate on decoding. Post-processing introduces a phase shift to the signal and the use of two different forms of post-processing implies problems of phase continuity during the transitions.

According to an embodiment of the present invention, during switching from an initial bitrate to a final bitrate, said method includes a transition step of continuous change from a signal at the initial bitrate to a signal at the final bitrate, one or both of said signals being post-processed.

Thus the invention has the advantage that decoding comprises post-processing depending on the bitrate, and continuous change from post-processing at the initial bitrate to post-processing at the final bitrate is effected during said transition step. This feature of the invention is described in detail below, and corresponds to effecting a "cross fade" in the post-processing applied to the audio signal decoded at the initial bitrate. It can be seen that this is particularly advantageous on bitrate switching between telephone band, in which the decoded signal is post-processed, and wideband, in which the audio signal is generally not post-processed.

In one particular embodiment, said continuous change is effected by weighting that reduces the weight of the signal at the initial bitrate and increases the weight of the signal at the final bitrate.

In an embodiment of the invention, the signal at the initial bitrate and the signal at the final bitrate are both post-processed.

One aspect of the invention provides a computer program comprising code instructions for executing the method of the invention when said program is executed by a computer.

An embodiment of the invention provides an application of the method of the invention to a bitrate-scaleable audio decoding system.

An embodiment of the invention provides an application of the method of the invention to a bitrate-scalable and bandwidth-scalable audio decoding system in which the initial bitrate is obtained by a first decoding layer in a first frequency band and the final bitrate is obtained by a second decoding layer, referred to as the layer extending said first frequency band into a second frequency band, the post-processing step being applied to the decoding carried out at the initial bitrate.

An embodiment of the invention provides an application of the method of the invention to a bitrate-scalable and bandwidth-scalable audio decoding system in which the final bitrate is obtained by a first decoding layer in a first frequency band and the initial bitrate is obtained by a second decoding layer, referred to as the layer extending said first frequency band into a second frequency band, the post-processing step being applied to the decoding carried out at the final bitrate.

A particular example of an "extended band" is the above-defined "wideband", said first band then being telephone band.

An embodiment of the invention provides a multirate audio decoder noteworthy in that the said decoder including a post-processing stage depending on the bitrate, said post-processing stage is adapted, on switching from an initial bitrate to a final bitrate, to effect a transition by continuous change from a signal at the initial bitrate to a signal at the final bitrate, at least one of said signals being post-processed.

In particular, said post-processing stage is adapted to effect said continuous change by weighting that reduces the weight of the signal at the initial bitrate and increases the weight of the signal at the final bitrate.

BRIEF DESCRIPTION OF THE DRAWINGS

FIG. 8 is a table summarizing the operation of the FIG. 7 flowchart.

FIG. 9 is a table setting out the adaptive attenuation coefficients for switching from telephone band to wideband.

DETAILED DESCRIPTION OF THE DRAWINGS

The invention is described below in the context of a bitrate-scalable and bandwidth-scalable audio coder. The bitrate-scalable and bandwidth-scalable coding structure that is considered here uses for core coding a telephone band CELP type coder, one particular instance of which uses the G.729A coder as described in ITU-T Recommendation G.729, Coding of Speech at 8 kbit/s using Conjugate Structure Algebraic Code Excited Linear Prediction (CS-ACELP), March 1996, and in R. Salami et al., Description of ITU-T Recommendation G.729 Annex A: Reduced complexity 8 kbit/s CS-ACELP codec, ICASSP 1997.

Three enhancement stages are added to the CELP core coding, namely telephone band CELP coding enhancement, band extension, and predictive transform coding.

The bitrate switching considered here is switching between telephone band and wideband.

Figure 1:
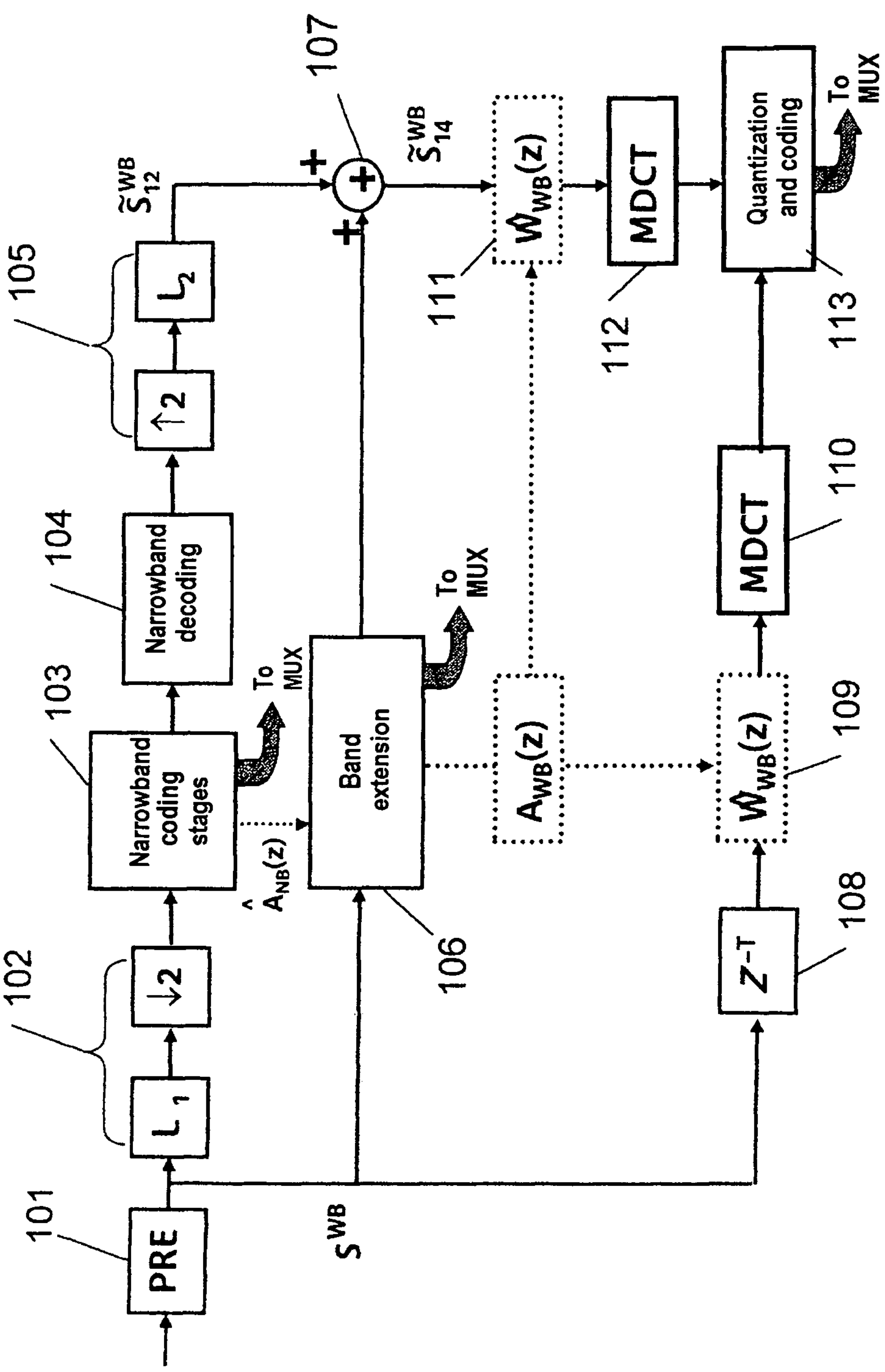
FIG. 1 is a diagram of a 4-layer bitrate-scalable and bandwidth-scalable coder.

FIG. 1 is a diagram of the coder used.

An audio signal with an audio band of 50 Hz-7000 Hz sampled at 16 kHz is divided into 20 millisecond (ms) frames of 320 samples. High-pass filtering 101 with a cut-off frequency of 50 Hz is applied to the input signal. The signal $S^{WB}$ obtained is used in a number of branches of the coder.

Firstly, in a first branch, low-pass filtering and undersampling by a factor of two, 102, from 16 kHz to 8 kHz are applied to the signal $S^{WB}$. This operation produces a telephone band signal sampled at 8 kHz. This signal is processed by the core coder 103 using CELP type coding. Here the coding corresponds to the G.729A coder, which generates the core of the bit stream with a bitrate of 8 kbps.

A first enhancement layer then introduces a second stage 103 of CELP coding. This second stage consists in an innovator dictionary that effects enrichment of the CELP excitation and offers quality enhancement, particularly for non-voiced sounds. The bitrate of this second coding stage is 4 kbps and the associated parameters are the positions and the signs of the pulses and the gain of the associated innovator dictionary for each sub-frame of 40 samples (5 ms at 8 kHz).

The decoding of the core coder and the first enhancement layer are carried out to obtain the synthesized 12 kbps signal 104 in telephone band. Oversampling by a factor of two from 8 kHz to 16 kHz and low-pass filtering 105 produce the version sampled at 16 kHz from the first two stages of the coder.

The third enhancement layer effects band extension 106 to wideband. The input signal $S^{WB}$ can be pre-processed by a pre-emphasis filter. The pre-emphasis filter produces a better representation of the high frequencies from the wideband linear prediction filter. To compensate for the effect of the pre-emphasis filter, an inverse de-emphasis filter is then used in synthesis. An alternative to this coding and decoding structure does not use pre-emphasis or de-emphasis filters.

The next step calculates and quantizes the wideband linear prediction filters. The linear prediction filter is an $18^{th}$ order filter, but a lower prediction order can be chosen, for example $16^{th}$ order prediction. The linear prediction filter can be calculated by an autocorrelation method using the Levinson-Durbin algorithm.

This wideband linear prediction filter $A^{WB}(Z)$ is quantized using a prediction of the coefficients from the filter $\hat{A}^{WB}(z)$ from the telephone band core coder. The coefficients can then be quantized using multistage vector quantization, for example, and using the dequantized LSF (line spectrum frequency) parameters of the telephone band core coder, as described in the paper by H. Ehara, T. Morii, M. Oshikiri, and K. Yoshida, Predictive VQ for bandwidth scalable LSP quantization, ICASSP 2005.

The wideband excitation is obtained from telephone band excitation parameters of the core coder: the pitch period delay, the associated gain, and the algebraic excitations of the core coder and the first enrichment layer of the CELP excitation and the associated gains. This excitation is generated using an oversampled version of the parameters of the telephone band stage excitation.

This wideband excitation is then filtered by a synthesis filter that has been calculated previously. If pre-emphasis has been applied to the input signal, a de-emphasis filter is applied to the output signal of the synthesis filter. The signal obtained is a wideband signal whose energy has not been adjusted. To calculate the gain for leveling the energy of the high band (3400 Hz-7000 Hz), high-pass filtering is applied to the wideband synthesis signal. In parallel with this, the same high-pass filtering is applied to the error signal corresponding to the difference between the delayed original signal and the synthesis signal of the preceding two stages. These two signals are then used to calculate the gain to be applied to the synthesized wideband signal. This gain is calculated by means of an energy ratio between the two signals. The quantized gain $g_{WB}$ is then applied to the signal $S_{14}{}^{WB}$ at the level of a sub-frame of 80 samples (5 ms to 16 kHz), and the signal obtained in this way is then added to the synthesized signal from the preceding stage to create the wideband signal that corresponds to the bitrate of 14 kbps.

The remainder of coding is effected in the frequency domain using a predictive transform coding scheme. The delayed input signals 108 and 14 kbps synthesis signals 107 are filtered by a perceptual waiting filter 109, 111 of $A_{WB}(z/y)*(1-\mu z)$, typically y=0.92 and $\mu$=0.68. These signals are then encoded by the TDAC (time domain aliasing cancellation) overlap transform coding scheme (Y. Mahieux and J. P. Petit, Transform coding of audio signals at 64 kbit/s, IEEE GLOBECOM 1990).

Figure 3:
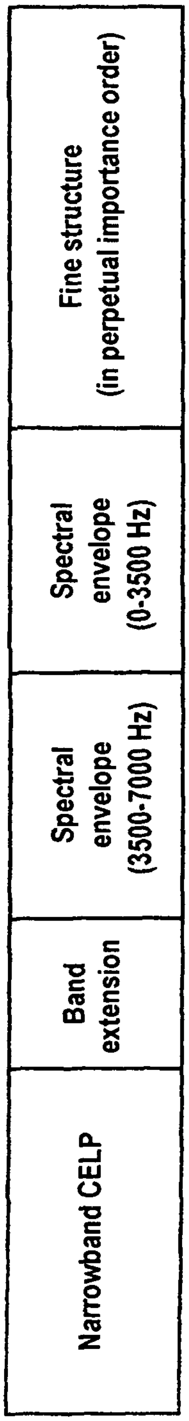
FIG. 3 shows a structure of the bit stream associated with the FIG. 1 coder.

A modified discrete cosine transform (MDCT) is applied: both, 110, to blocks of 640 samples of the weighted input signal with an overlap of 50% (refreshing of the MDCT analysis every 20 ms), and also, 112, to the weighted synthesis signal from the preceding band extension stage at 14 kbps (same block length and same overlap). The MDCT spectrum to be encoded, 113, corresponds to the difference between the weighted input signal and the synthesis signal at 14 kbps for the 0 to 3400 Hz band and to the weighted input signal from 3400 Hz to 7000 Hz. The spectrum is limited to 7000 Hz by setting to zero the last 40 coefficients (only the first 280 coefficients are coded). The spectrum is divided into 18 bands: one band of eight coefficients and 17 bands of 16 coefficients. For each band of the spectrum, the energy of the MDCT coefficients is calculated (scale factors). The 18 scale factors constitute the spectral envelope of the weighted signal that is then quantized, coded, and transmitted in the frame. FIG. 3 shows the format of the bit stream.

Dynamic bit allocation is based on the energy of the bands of the spectrum from the de-quantized version of the spectral envelope. This achieves compatibility between the binary allocation of the coder and the decoder. The normalized (fine structure) MDCT coefficients in each band are then quantized by vector quantizes using dictionaries interleaved in size and in dimension, the dictionaries consisting of a union of permutation codes as described in C. Lamblin et al., "Quantification vectorielle en dimension et resolution variables" ["Vector quantization with variable dimension and resolution"], patent PCT FR 04 00219, 2004. Finally, the information on the core coder, the telephone band CELP enhancement stage, the wideband CELP stage and finally the spectral envelope and the normalized coded coefficients are multiplexed and transmitted in frames.

Figure 2:
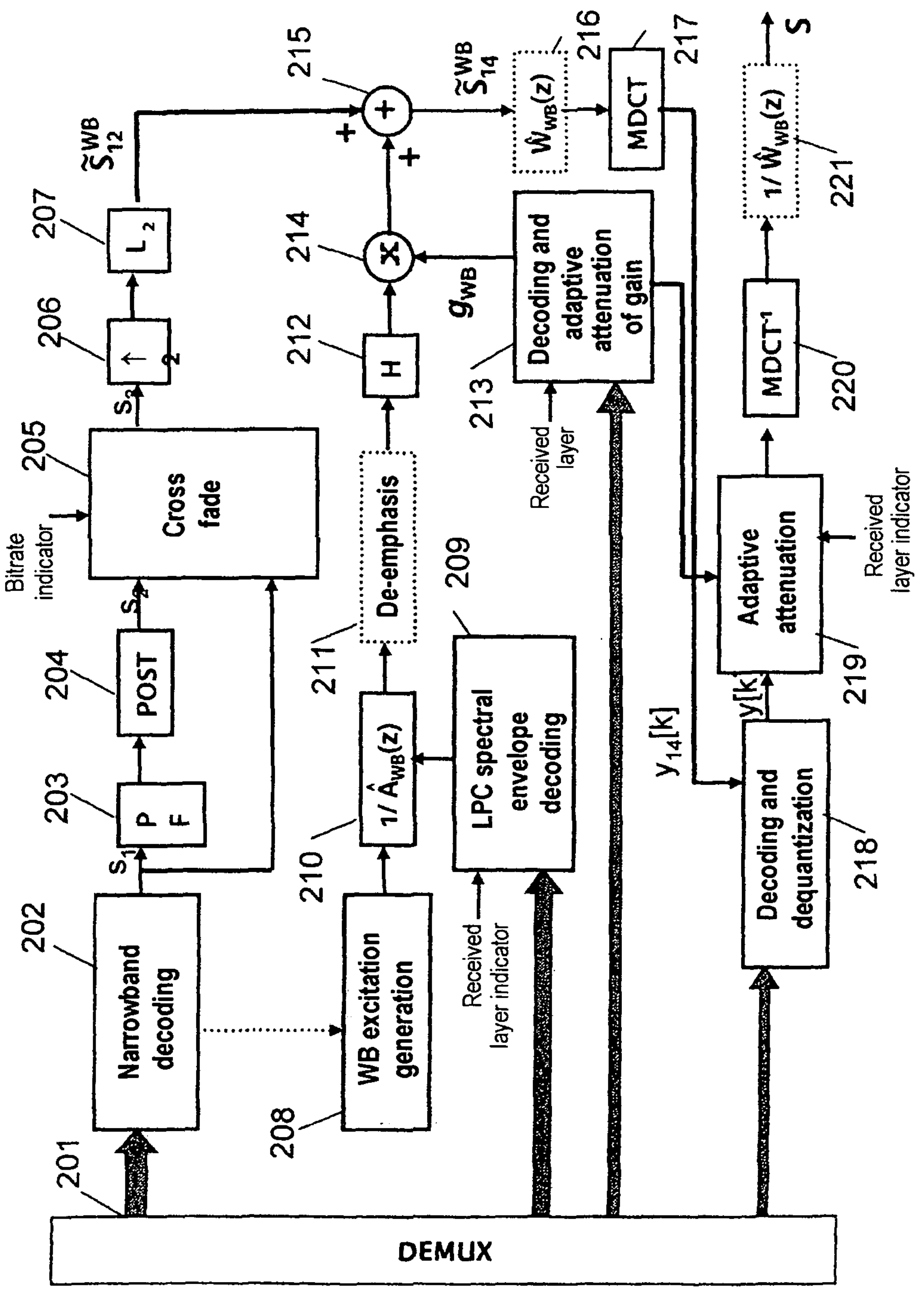
FIG. 2 is a diagram of a decoder of the invention associated with the coder from FIG. 1.

FIG. 2 is a block diagram of the decoder associated with the coder from FIG. 1.

The module 2701 demultiplexes the parameters contained in the bit stream. There are multiple cases of decoding as a function of the number of bits received for a frame, and four cases are described with reference to FIG. 2:

1. The first concerns the reception of the minimum number of bits by the decoder, for a received bitrate of 8 kbps. In this case, only the first stage is decoded. Thus only the bit stream relating to the CELP (G.729A+) type core decoder 202 is received and decoded. This synthesis can be processed by adaptive post-filtering 203 and high-pass filtering post-processing 204 by the G.729 decoder. In this embodiment, the term "post-processing" refers to the combination of these two operations. However, it is clear that the term "post-processing" can also refer only to adaptive post-filtering or only to high-pass filtering type post-processing. This signal is oversampled, 206, and filtered, 207, to produce a signal sampled at 16 kHz.

2. The second case concerns the reception of the number of bits relating to the first and second decoding stages only, for a received bitrate of 12 kbps. In this case, the core decoder and the first CELP excitation enrichment stage are decoded. This synthesis can be processed by post-processing 203, 204 by the G.729 decoder. As before, this signal is oversampled 206 and filtered 207 to produce a signal sampled at 16 kHz.

3. The third case corresponds to the reception of the number of bits relating to the first three decoding stages, for a received bitrate of 14 kbps. In this case, the first two decoding stages are effected first, as in case 2, apart from the fact that post-processing is not applied to the CELP decoding output, after which the band extension module generates a signal sampled at 16 kHz after decoding the parameters of the pairs of spectral lines (WB-LSF) in the wideband, 209, as well as the gains associated with the excitation, 213. The wideband excitation is generated from the parameters of the core coder and the first CELP enrichment stage 208. This excitation is then filtered by the synthesis filter 210 and where appropriate by the de-emphasis filter 211, if a pre-emphasis filter was used in the coder. A high-pass filter 212 is applied to the signal obtained and the energy of the band extension signal is adapted by means of the associated gains 214 every 5 ms. This signal is then added to the telephone band signal sampled at 16 kHz obtained from the first two decoding-stages 215. With the aim of obtaining a signal limited to 7000 Hz, this signal is filtered in the transform domain by setting to 0 the last 40 MDCT coefficients before the inverse MDCT 220 and the weighted synthesis filter 221.

4. This last case corresponds to decoding all stages of the decoder, for a received bitrate greater than or equal to 16 kbps. The last stage consists of a predictive transform decoder. The step 3 described above is carried out first. Then, as a function of the number of additional bits received, the predictive transform decoding scheme is adapted:

If the number of bits corresponds to only a portion of the spectral envelope, or to the whole of it but without the fine structure being received, the partial or complete spectral envelope is used to adjust the energy of the bands of MDCT coefficients, 216 and 217, in the range 3400 Hz tp 7000 Hz, 218, corresponding to the signal generated by the band extension stage 215. This system achieves progressive enhancement of audio quality as a function of the number of bits received.

If the number of bits corresponds to the whole of the spectral envelope and to a portion or the whole of the fine structure, bit allocation is effected in the same way as in the encoder. In the bands in which the fine structure is received, the decoded MDCT coefficients are calculated from the spectral envelope and the dequantized fine structure. In the spectral bands in the range 3400 Hz to 7000 Hz in which the fine structure has not been received, the procedure from the preceding paragraph is used, i.e. the MDCT coefficients calculated from the signal obtained by extension of the band, 216 and 217, are adjusted in energy on the basis of the received spectral envelope 218. The MDCT spectrum used for the synthesis is therefore constituted: both by the synthesized signal in the first two decoding stages added to the decoded error signal in the bands between 0 and 3400 Hz; on and also, for the bands in the range 3400 Hz to 7000 Hz, by the MDCT coefficients decoded in the bands in which the fine structure has been received and the MDCT coefficients of the band extension stage adjusted in energy for the other spectral bands.

An inverse MDCT is then applied to the decoded MDCT coefficients, 220, and filtering by the weighted synthesis filter, 221, produces the output signal.

The switching method in accordance with the invention is described below in the context of the decoder from FIG. 2.

The block 205 represents a "cross fade" module. If the number of bits received by the decoder is insufficient to decode other than the first stage or the first and second stages, i.e. for a received bitrate of 8 kbps or 12 kbps, the effective bandwidth of the final output of the decoder is the telephone band. In these circumstances, in order to enhance the quality of the synthesized signal, the post-processing 203, 204 in the broad sense that is part of the G.729A decoder is applied in the telephone band, before oversampling.

In contrast, if the decoding in the wideband stages is also effected, for a received bitrate greater than or equal to 14 kbps, this post-processing is not activated because, in the encoder, the encoding of the higher stages has been computed from the version without post-processing of the telephone band.

Figure 4:
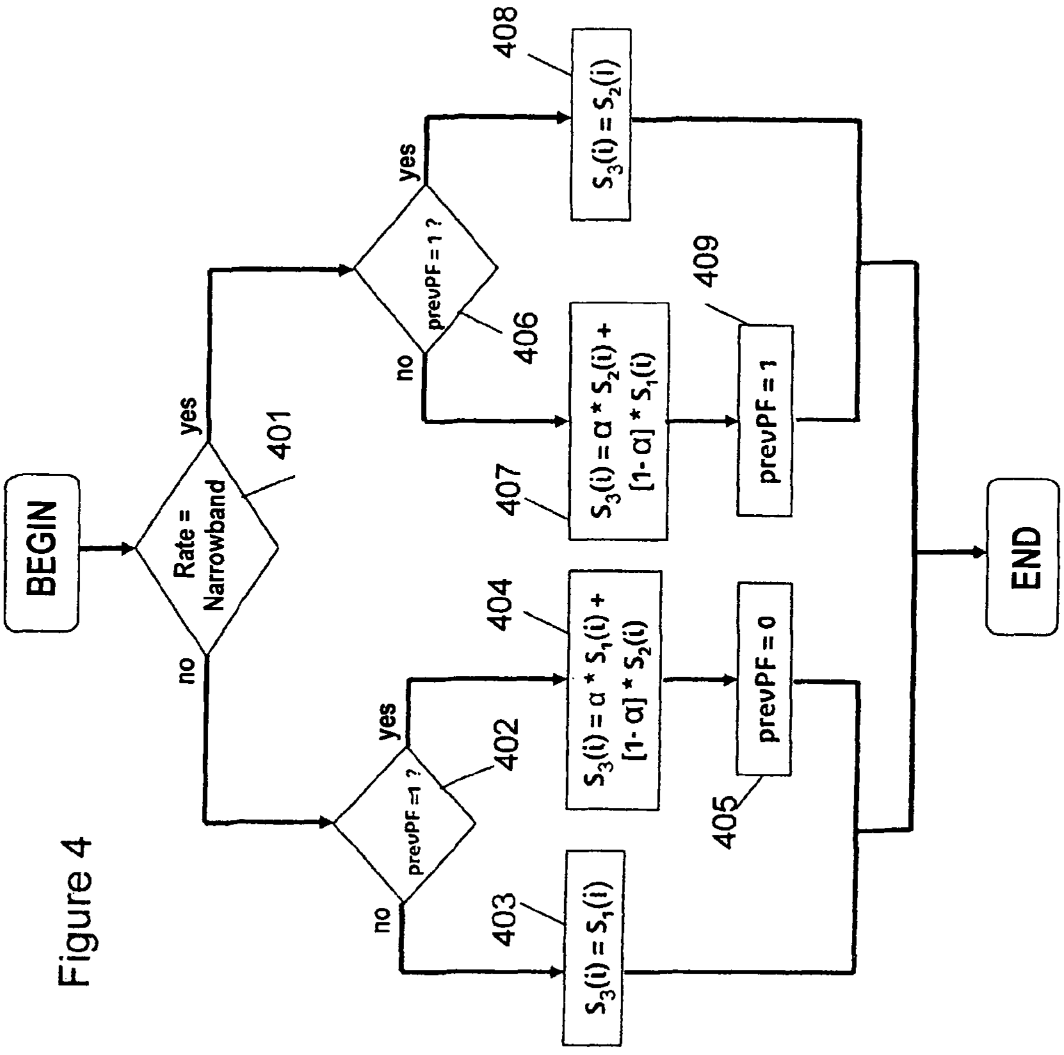
FIG. 4 is a flowchart of a method of switching between a post-processed signal and a non-post-processed signal in the telephone band of the decoder of the invention.

Post-processing, 203 and 204, introduces a phase shift into the signal. On switching between modes with and without post-processing, a soft transition must therefore be provided. FIG. 4 shows the implementation of the block 205 that provides this slow transition between the post-processed and non-post-processed telephone band signal, by applying cross fades.

The step 401 examines if the current frame is a telephone band frame or not, i.e. verifies if the bitrate of the current frame is 8 kbps or 12 kbps. In the event of a negative response, a step 402 is invoked to verify if the preceding frame was post-processed or not in the telephone band (which amounts to verifying if the bitrate of the preceding frame was 8 kbps-12 kbps or not). In the event of a negative response, in the step 403, the non-post-processed signal $S_1$ is copied into the signal $S_3$. In contrast, on a positive response to the test 402, in the step 404, the signal $S_3$ will contain the result of a cross fade, where the weight of the non-post-processed component $S_1$ increases whereas the weight of the post-filtered component $S_2$ decreases. The step 404 is followed by the step 405 which updates the flag prevPF with the value 0.

When there is a positive response in the step 401, verification is performed in a step 406 as to whether or not post-processing in the telephone band was active or not in the preceding frame. In the event of a positive response, in the step 408, the post-processed signal $S_2$ is copied into the signal $S_3$. In contrast, in the event of a negative response in the step 406, the signal $S_3$ is calculated, in the step 407, as the result of a cross fade, where this time the weight of the non-post-processed component $S_1$ decreases whereas the weight of the post-processed component $S_2$ increases. After the step 407, the step 409 is invoked to update the flag prevPF with the value 1.

In a variant of this embodiment, if the number of bits received by the decoder allows only the first stage or the first and second stages to be decoded, i.e. for a received bitrate of 8 or 12 kbps, the effective bandwidth of the final output of the decoder is the telephone band (signal $S_1$). In these circumstances, in order to enhance the quality of the synthesized signal, post-processing in the telephone band is applied before oversampling.

In contrast, if wideband stage decoding is also carried out, for a received bitrate greater than or equal to 14 kbps, different post-processing is activated (signal $S_2$) in the encoder, the encoding of the higher stages having been calculated from the version with this post-processing of the telephone band.

The post-processing used for bitrates of 8 or 12 kbps and the post-processing used for bitrates greater than or equal to 14 kbps introduce different phase shifts into the signal. On switching between modes with different forms of post-processing a soft transition must therefore be provided. This slow transition between the telephone band signals with the various forms of post-processing is effected by applying cross fades (which yield the signal $S_3$).

Whether the current frame is a telephone band frame or not is verified. In the event of a negative response, whether the preceding frame was a telephone band frame is verified. In the event of a negative response, the post-processed signal S1 is copied into the signal S3. In contrast, in the event of a positive response, the signal S3 will contain the result of a cross fade where the weight of the post-processed component S1 increases and the weight of the post-processed component S2 decreases.

When there is a positive response, it is verified whether or not the preceding frame was a telephone band frame. In the event of a positive response, the post-processed signal S2 is copied into the signal S3. In contrast, in the event of a negative response, the signal S3 is calculated as the result of a cross fade, where this time the weight of the post-processed component S1 decreases and the weight of the post-processed component S2 increases.

The block 209 calculates the wideband linear prediction filters necessary for the band extension and predictive transform decoding stages. This calculation is necessary if only the telephone band portion of the bit stream of a frame is received, after receiving a wideband frame and extension of the band is required in order to maintain the band effect. A set of LSF is then extrapolated from the LSF of the telephone band core decoder. For example, 8 LSF can be uniformly distributed over the band between the last LSF coming from the telephone band and the Nyquist frequency. The linear prediction filter can then tend toward a flat amplitude response filter for the high frequencies.

The block 213 provides the gain adaptation used for band extension in accordance with the present invention. The flowcharts corresponding to this block are described with reference to FIGS. 5 and 7.

Figure 5:
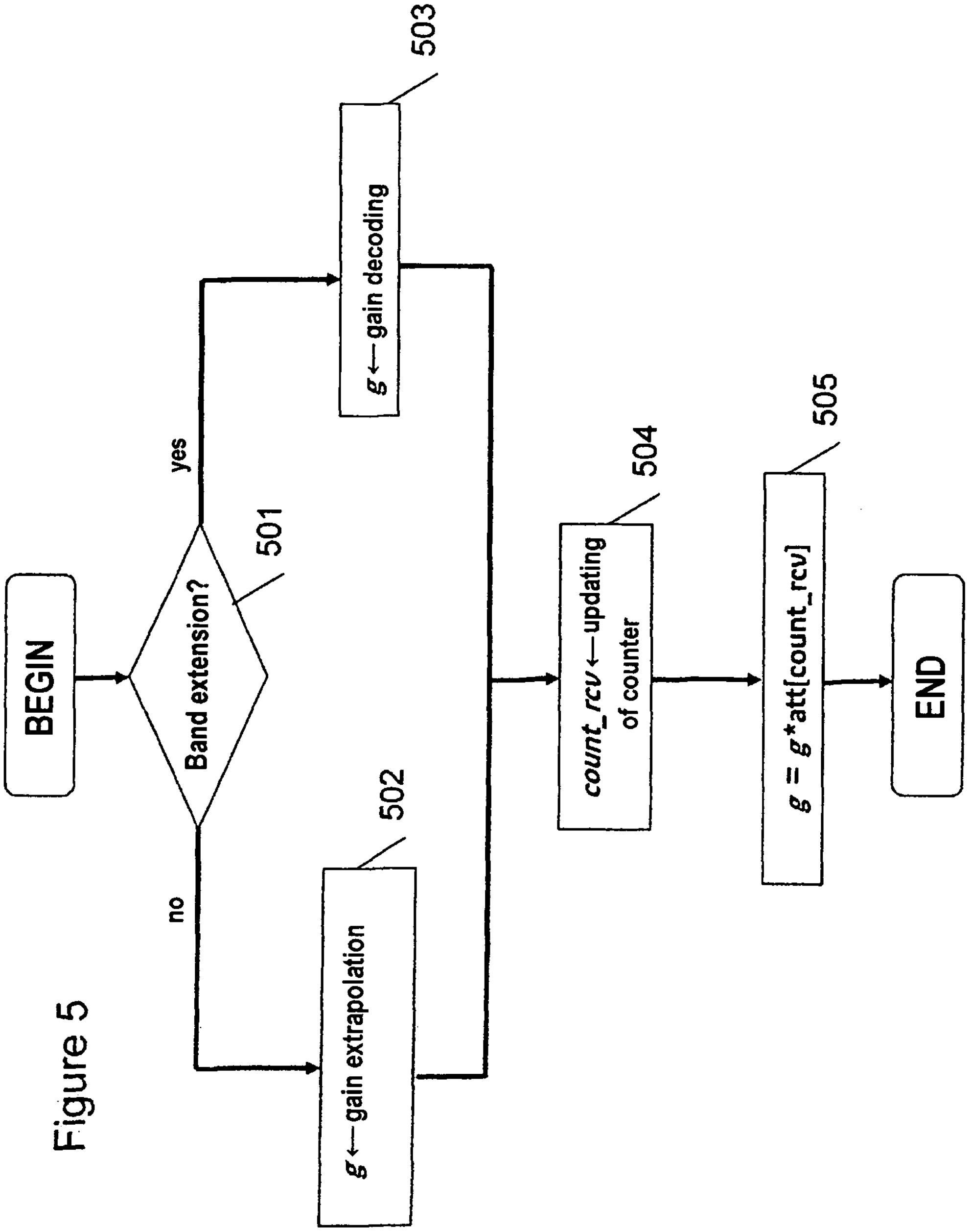
FIG. 5 is a flowchart of the method in accordance with the invention for switching between a telephone band and a wideband with band extension.

The principle of adaptive attenuation of the gain applied to the high band is described with reference to FIG. 5. First of all, the gain of the first wideband decoding layer is calculated, 501, in accordance with two possibilities. If the bit stream corresponding to this band extension layer has been received, the gain is obtained by decoding, 503. In contrast, if this gain has not been received in the bit stream, the gain associated with this decoding layer is extrapolated, 502. For example, a gain calculation can be carried out by aligning the energy of the baseband of the wideband decoding stage with the real decoding of the telephone band carried out previously.

A counter of the number of wideband frames previously received is then updated, 504, according to the principle described with reference to FIG. 7.

Finally, this counter is used to set the parameters of the attenuation applied to the gain of the first wideband decoding stage, 505.

Figure 7:
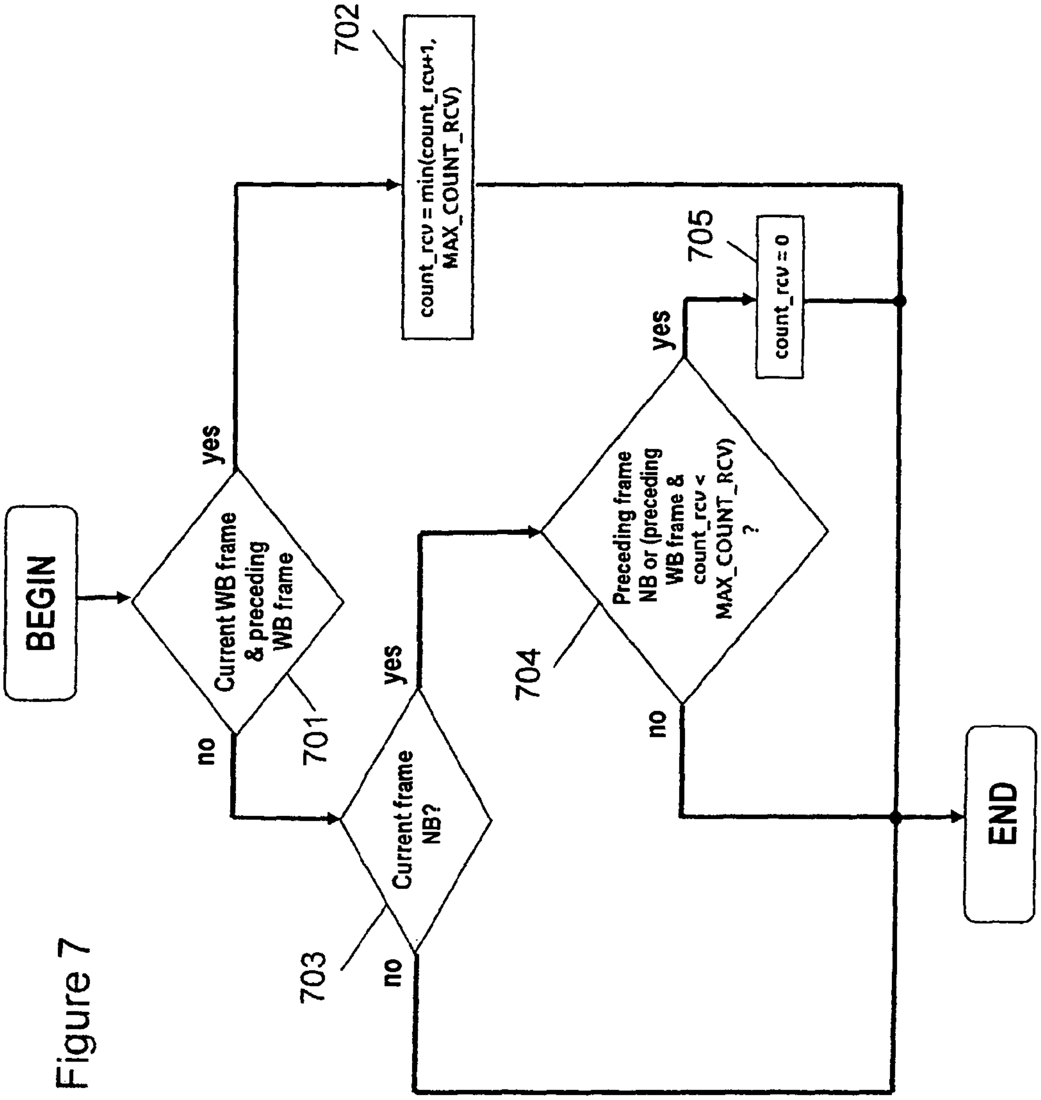
FIG. 7 is a flowchart of a process for managing the counting of received wideband frames for switching between bitrates and between bands by the method of the invention.

FIG. 7 represents the flowchart of a process for managing the counting of the number of wideband frames received. The counter is updated in the following manner. If the current frame is a wideband frame, then if the gain associated with the first wideband decoding stage has been received (block 501, FIG. 5) and the preceding frame is also a wideband frame, then the counter is incremented by 1 and saturated at the value MAX_COUNT_RCV. This value corresponds to the number of frames during which the wideband decoded signal will be attenuated during switching between a telephone band bitrate and a wideband bitrate.

In contrast, if the current frame received is a telephone band frame, there are several possible behaviors. If the preceding frame was also a telephone band frame, the counter is set to 0. If not, if the preceding frame was a wideband frame and the counter has a value less than MAX_COUNT_RCV, the counter is also set to 0. In all other circumstances, the counter remains at the preceding value.

The functioning of this flowchart is summarized in the FIG. 8 table. The values taken by the attenuation coefficient are set out in the FIG. 9 table when MAX_COUNT_RCV takes the value 100, this table being provided by way of example. Note that up to frame 65 the attenuation coefficient is held at 0, corresponding to a phase extending the decoding in the telephone band. The transition phase proper is effected from frame 66 by progressively increasing the attenuation coefficient.

Figure 6:
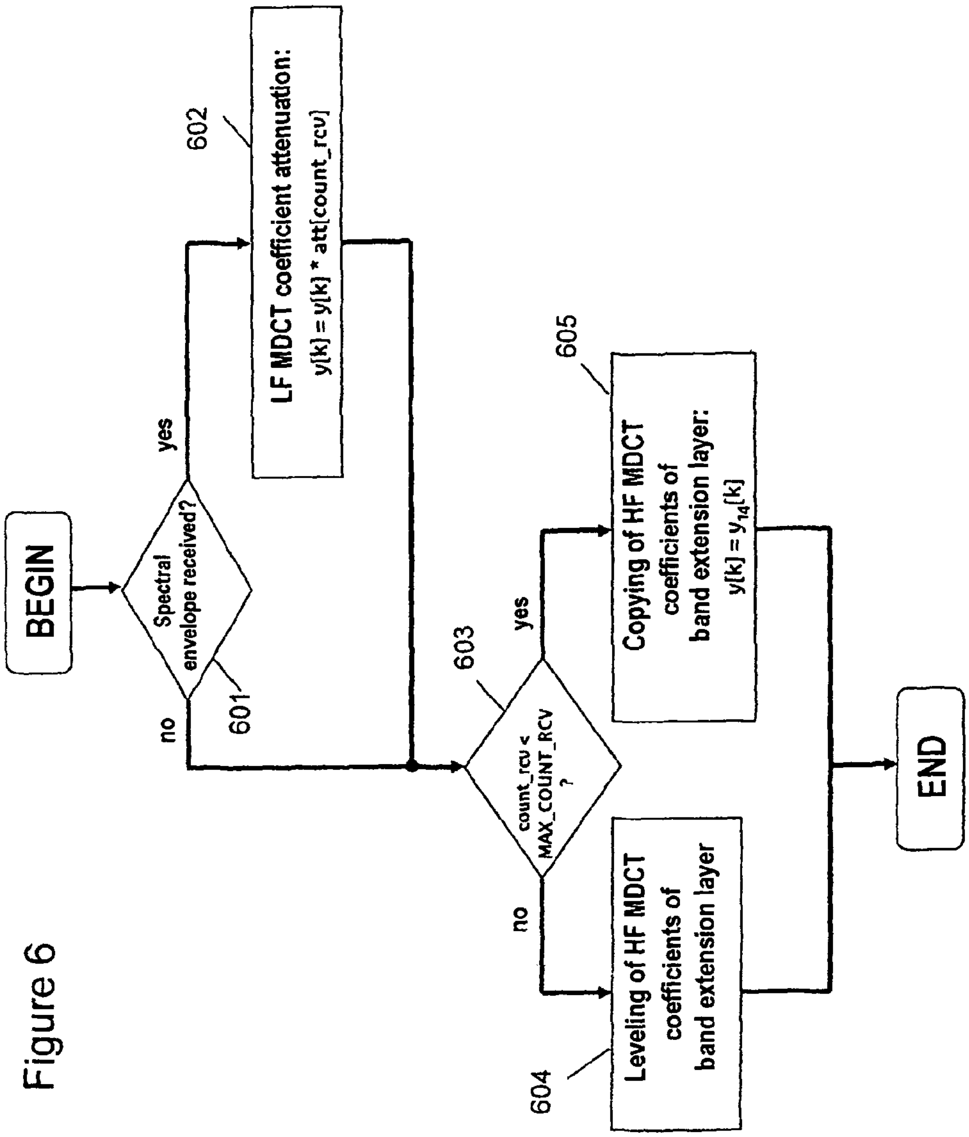
FIG. 6 is a flowchart of the switching method in accordance with the invention for switching between a telephone band and a wideband with a predictive transform decoding layer.

The block 219 effects adaptive attenuation of the enhancement layers by predictive coding by transform in accordance with the invention as described with reference to FIG. 6.

This figure is the flowchart of the adaptive attenuation procedure of the predictive transform decoding layer. Firstly, whether the spectral envelope of this layer has been received in full is verified, 601. If so, then the 0-3500 Hz low-band correction MDCT correction coefficients are attenuated, 602, using the received wideband frame counter and the attenuation table of FIG. 9.

Then, in both cases, the number of wideband frames received is monitored. If that number is less than MAX_COUNT_RCV, the MDCT coefficients corresponding to the first wideband decoding stage with band extension with transmission of information are used for the predictive transform decoding stage. In contrast, if the counter has the maximum value, then the procedure is carried out for leveling the energy of the predictive transform decoding bands with the decoded spectral envelope.

The invention claimed is:

1. A method of bitrate switching when decoding an audio signal coded by a multirate audio coding system, said method comprising:

supplying a first signal and a second signal from a decoded signal to an input of a cross-fading module, at least one of the first and second signals being post-processed in a post-processing step, the post-processing forming part of a set of post-processing operations suited to different sets of rates;

upon detection of a rate switch between a current frame at a rate lying within a first set of rates and a preceding frame at a rate lying within a second set of rates, performing crossfading by weighting to reduce a weight of the second signal, whether post-processed or unpost-processed, according to the post-processing suited to the second set of rates and to increase a weight of the first signal, whether post-processed or unpost-processed, according to the post-processing suited to the first set of rates to obtain an output signal; and upon detection of a rate switch between a current frame at a rate lying within a second set of rates and a preceding frame at a rate lying within a first set of rates, performing a cross-fading by weighting to reduce the weight of the first signal, whether post-processed or unpost-processed, according to the post-processing suited to the first set of rates and to increase the weight of the second signal, whether post-processed or unpost-processed, according to the post-processing suited to the second set of rates to obtain an output signal.

2. The method according to claim 1, wherein one post-processing operation of the post processing operations comprises high-pass filtering.

3. The method according to claim 1, wherein one post-processing operation of the post processing operations comprises adaptive post-filtering.

4. The method according to claim 1, wherein one post-processing operation of the post processing operations comprises a combination of high-pass filtering and adaptive post-filtering.

5. The method according to claim 1, wherein a single signal at the input of the cross-fading module is post-processed.

6. The method according to claim 1, wherein the first and second signals at the input of the cross-fading module are both post-processed with different post-processing operations suited to different sets of rates.

7. A non-transitory computer readable medium encoded with a computer program executed by a processor which causes bitrate switching when decoding an audio signal coded by a multirate audio coding system, the computer program comprising:

program code instructions for supplying a first signal and a second signal from a decoded signal to an input of a cross-fading module, at least one of the first and second signals being post-processed in a post-processing step, the post-processing forming part of a set of post-processing operations suited to different sets of rates;

program code instructions for, upon detection of a rate switch between a current frame at a rate lying within a first set of rates and a preceding frame at a rate lying within a second set of rates, performing crossfading by weighting to reduce a weight of the second signal, whether post-processed or unpost-processed, according to the post-processing suited to the second set of rates and to increase a weight of the first signal, whether post-processed or unpost-processed, according to the post-processing suited to the first set of rates to obtain an output signal;

program code instructions for, upon detection of a rate switch between a current frame at a rate lying within a second set of rates and a preceding frame at a rate lying within a first set of rates, performing a cross-fading by weighting to reduce the weight of the first signal, whether post-processed or unpost-processed, according to the post-processing suited to the first set of rates and to increase the weight of the second signal, whether post-processed or unpost-processed, according to the post-processing suited to the second set of rates to obtain an output signal.

8. The method according to claim 1, wherein the method is implemented in a bitrate-scalable audio decoding system.

9. The method according to claim 1, wherein the method is implemented in a bitrate-scalable and bandwidth-scalable audio decoding system, the method further comprising:

obtaining the first rate by a first decoding layer in a first frequency band; and obtaining the second rate by a second decoding layer comprising a layer extending said first frequency band into a second frequency band.

10. A multirate audio decoder, comprising:

a cross fade module receiving as input a first signal and a second signal obtained from a decoded signal, at least one of the first and second signals having undergone post-processing from a set of post-processing operations suited to different sets of rates, the crossfading module being configured to:

upon detection of a rate switch between a current frame at a rate lying within a first set of rates and a preceding frame at a rate lying within a second set of rates, perform a cross-fading by weighting to reduce a weight of the second signal, whether post-processed or unpost-processed, according to a post-processing operation suited to the second set of rates and to increase the weight of the first signal, whether post-processed or unpost-processed, according to the post-processing operation suited to the first set of rates, to obtain an output signal from the cross-fading module; and upon detection of a rate switch between a current frame at a rate lying within a second set of rates and a preceding frame at a rate lying within a first set of rates, perform a cross-fading by weighting to reduce a weight of the first signal, whether post-processed or unpost-processed, according to a post-processing operation suited to the first set of rates and to increase the weight of the second signal, whether post-processed or unpost-processed, according to the post-processing operation suited to the second set of rates to obtain an output signal from the cross-fading module.

11. The decoder according to claim 10, wherein one post-processing operation of the post-processing operations comprises high-pass filtering.

12. The decoder according to claim 10, wherein one post-processing operation of the post-processing operations comprises adaptive post-filtering.

13. The decoder according to claim 10, wherein one post-processing operation of the post-processing operations comprises a combination of high-pass filtering and adaptive post-filtering.

14. The decoder according to claim 10, wherein the first and second signals at the input of the cross-fading module are both post-processed with different post-processing operations suited to different sets of rates.

15. The decoder according to claim 10, wherein a single signal at the input of the cross-fading module is post-processed.

* * * * *